United States Patent [19]

Robinet

[11] Patent Number: 4,868,036

[45] Date of Patent: Sep. 19, 1989

[54] POLYMERIC COMPOSITION WITH HIGH IMPACT STRENGTH

[75] Inventor: Jean-Claude Robinet, Lamorlaye, France

[73] Assignee: Norsolor, France

[21] Appl. No.: 239,868

[22] Filed: Sep. 2, 1988

[30] Foreign Application Priority Data

Sep. 4, 1987 [FR] France ................................ 87-12295

[51] Int. Cl.[4] ...................... C08L 27/16; C08L 33/08; C08L 33/10
[52] U.S. Cl. ...................................... 428/220; 525/72; 525/199; 428/421; 428/422; 524/520; 524/504
[58] Field of Search .................. 525/72, 199; 428/220, 428/421, 422

[56] References Cited

U.S. PATENT DOCUMENTS

| 3,253,060 | 5/1966 | Koblitz et al. | 525/199 |
| 3,294,871 | 12/1966 | Schmitt et al. | 525/199 |
| 3,459,834 | 8/1969 | Schmitt et al. | 525/199 |
| 3,524,906 | 8/1970 | Schmitt et al. | 525/199 |
| 3,969,469 | 7/1976 | Love | 525/72 |
| 4,400,487 | 8/1983 | Stoneberg et al. | 525/199 |

FOREIGN PATENT DOCUMENTS 61-106649  5/1986  Japan ..................... 525/72

Primary Examiner—Carman J. Seccuro
Attorney, Agent, or Firm—Finnegan, Henderson, Farabow, Garrett & Dunner

[57] ABSTRACT

A polymeric composition of at least one matrix polymer based on methyl methacrylate, at least one elastomeric latex, and at least one polymer based on fluorovinyledene, the amounts of each component specified relative to one another.

12 Claims, No Drawings

POLYMERIC COMPOSITION WITH HIGH IMPACT STRENGTH

BACKGROUND OF THE INVENTION

The present invention relates to polymeric compositions having high impact strength, comprising a major portion by weight of a fluorovinylidene polymer or a copolymer of fluorovinylidene and a substantial quantity of tetrafluoroethylene, and a minor portion by weight of a methyl methacrylate polymer; and a process to produce the same.

The use of methyl methacrylate polymers in impact resistant compositions is known, particularly from European Patents Nos. EP-A-093,038 and EP-A-101,048. French Patent No. FR-A-2,104,545 teaches the polymerization of up to 150 parts by weight of methyl methacrylate with 100 parts by weight of suspension polymerized polyvinylidene fluoride (as used herein, "PVF"), to obtain films having excellent electrical properties.

The use of polymeric sheets based upon polymethyl methacrylate (PMMA) is also well known in the art. Such sheets are used in extremely varied applications, especially in fields in which glass was previously used, because of their transparency, lightness, and low cost of manufacture. These sheets, however, are disadvantageous because of their lower impact strength as compared to safety glass and polymeric materials such as polycarbonate. They also exhibit inferior flame and bullet resistance as compared to polycarbonate.

SUMMARY OF THE INVENTION

The present invention relates to a polymeric composition having a high impact strength, comprising:

(A) at least one matrix polymer based on methyl methacrylate, (B) at least one elastomeric latex, (C) and including at least one polymer based on fluorovinylidene, such that the weight ratio (B)/(A) is between 0.1 and 0.5 and the weight ratio (C)/(A) is between 0.1 and 0.45.

An object of the present invention is to provide a polymeric composition of materials for the manufacture of cast sheets having improved impact resistance, particularly at low thicknesses.

DETAILED DESCRIPTION OF THE INVENTION

The present invention relates to a methyl methacrylate based polymer in which is dispersed an elastomeric latex, and including at least one polymer based on fluorovinylidene. As discussed below, the amounts of polymer and latex used are within certain limits.

Among the polymers based upon methyl methacrylate useful in the present invention are methyl methacrylate homopolymers, and copolymers containing small proportions of copolymerizable comonomers. For example, up to fifteen percent by weight of such comonomer may be used with the methyl methacrylate monomer. The homopolymer or copolymer is obtained by bulk polymerization, suspension polymerization or emulsion polymerization.

The elastomeric latex used in the present invention is a product obtained by emulsion block polymerization in aqueous medium, of essentially at least one "soft" monomer and one "hard" monomer. Useful soft monomers include butadiene and its derivatives, alkyl acrylates and aralkyl acrylates. Useful hard monomers include alkyl methacrylates, in which the alkyl group contains from one to four carbon atoms; styrene; substituted styrenes; acrylonitrile; and, methacrylonitrile. The polymerization of these monomers can optionally include other ethylenically unsaturated copolymerizable comonomers. Also, optionally, the polymerization may be in the present of either or both crosslinking and grafting monomers.

The manufacture of latexes such as that described, which are employed for the impact reinforcement of thermoplastic matrices, are known in the art. Thus it is known that variation in the conditions under which such latexes are produced affects the morphology of the latexes, and consequently the suitability of the latex for improving impact strength. Likewise, variation in the processing conditions may affect the suitability for maintaining desired optical properties in the matrices sought to be reinforced.

In the present invention, various morphologies of latexes are useful. Particularly, it is possible to employ a latex having a "soft-hard" morphology. In such a latex, an elastomeric core layer is produced, preferably from a poly(alkyl acrylate), and a rigid thermoplastic outer layer, preferably from a poly(alkyl methacrylate). Such a soft-hard latex is described in French patent No. FR-A-2,092,389.

It is alternatively possible to employ a latex having a "hard-soft-hard" morphology as the latex in the present invention. Such a latex includes a first, nonelastomeric phase polymerized from the same monomers making up the thermoplastic matrix to be reinforced by the latex; an intermediate elastomeric phase, preferably from an alkyl acrylate/styrene copolymer; and a third layer made from the same monomer or monomers as the matrix. Such a hard-soft-hard latex is described in French Patent FR-A-No. 2,159,822. When this morphology is used, it is preferred not to crosslink the hard core polymer. An example of such a hard-soft-hard morphology would include a core of 35–80 percent by weight of methyl methacrylate and 65–20 percent by weight butyl acrylate, and an intermediate phase of 80–95 percent by weight of butyl acrylate and 20–5 percent by weight of styrene.

Other more complex morphologies may also be employed. Such morphologies are described in, for instance, U.S. Pat. No. 4,052,525 and French Pat. No. FR-A-2,446,296.

Essentially, therefore, the elastomeric latex consists of particles comprising at least one soft elastomeric layer obtained from so-called "soft" monomers, and a layer for compatibilization with the matrix to be reinforced, obtained from so-called "hard" monomers. A special case is represented, but not limited to, particles having a morphology comprising a core of hard monomers, and intermediate layer of soft monomers, and a surface layer of hard monomers. The latex is therefore in the form of a compound, multi-layered interpolymer.

Particles in the latex preferably have a mean diameter between 40 and 500 nm.

The matrix additionally includes at least one polymer based on fluorovinylidene. Such polymers include the homopolymer of fluorovinylidene, and copolymers of fluorovinylidene and small amounts (less than 5 mol percent) of comonomers copolymerizable with fluorovinylidene. Such comonomers include, for example, tetrafluoroethylene.

To further illustrate the invention, a comparison of impact strength of the polymeric composition described herein with other compositions is set forth below. Table 1 identifies the samples test and the composition of each of those samples. Table 2 lists the results of the impact strength testing of the various samples. The comparisons are not intended to imply or set forth any limitation of the present invention.

TABLE 1

| Sample No. | Composition/Method of Making |
|---|---|
| 1 | OROGLASS DR 100 (Rohm & Haas), 60% by weight PMMA, 40% by weight elastomeric latex (particle avg. diameter = 300 nm) |
| 2 | 20 parts by weight PVF marketed under name SOLEF 2008 by Solvay, combined with 80 parts by weight OROGLASS DR 100, in a single screw Andouard B 40-20D extruder, RB 30 screw, fitted with a slot die. |
| 3 | 10 parts by weight PVF marketed under name SOLEF 2008 by Solvay, combined with 90 parts by weight OROGLASS DR 100, in a single screw Andouard B 40-20D extruder, RB 30 screw, fitted with a slot die. |

TABLE 2

| Sample No. | Notched Izod Impact Strength[1] | Unnotched Izod Impact Strength[2] | Multiaxial Impact Strength[3] |
|---|---|---|---|
| 1 | 46 J/m | 560 J/m | 1.7 J |
| 2 | 57 J/m | 950 J/m | 4.8 J |
| 3 | —[4] | —[4] | 3.8 J |

[1]Measured in accord with NFT Standard 51-911, with a thickness of 6 mm.
[2]Measured in accord with NFT Standard 51-911, with a thickness of 3 mm.
[3]Measured in accord with DIN Standard 53.443 at 23° C.
[4]Not measured for this sample.

The reinforced thermoplastic matrix described herein may be produced by the following process. In a first step, the matrix polymer and the latex are mixed at a temperature of between 170° C. and 240° C. Mixing may be performed, for example, on a roll mill or in a single screw extruder. The polymer based on fluorovinylidene is then added to the mixture in a second step, and the polymers and latex are mixed efficiently at a temperature of between 170° C. and 220° C.

Shaped articles may be made from the polymeric composition described above by processes known in the art. Preferably, but not exclusively, such articles are sheets having a thickness between 1 and 8 mm. In cases in which the latex employed in the composition comprises a hard core consisting of 35-80 percent by weight methyl methacrylate and 65-20 percent by weight butyl acrylate, and an intermediate phase consisting of 80-95 weight percent butyl acrylate and 5-20 percent by weight styrene, the shaped articles will advantageously be transparent.

Another embodiment of said shaped articles is a multilayered material comprising a sheet of the polymeric composition described above with a standard polymethyl methacrylate sheet.

Although the present invention has been described in connection with preferred embodiments, it is understood that modifications and variations may be made without departing from the scope of the present invention. Such modifications and variations are considered within the scope of the appended claims.

What is claimed is:

1. A high impact strength polymeric composition comprising:
   (A) at least one matrix polymer based on methyl methacrylate,
   (B) at least one elastomeric latex,
   (C) and at least one polymer based on fluorovinylidene,
   such that the weight ratio of elastomeric latex to matrix polymer is between 0.1 and 0.5 and the weight ratio of polymer based on fluorovinylidene to matrix polymer is between 0.1 and 0.45.

2. The polymeric composition of claim 1, wherein particles of the elastomeric latex have a mean diameter of 40-500 nm.

3. The polymeric composition of claim 1, wherein the elastomeric latex consists of particles comprising at least one elastomeric layer made from soft monomers, and a second layer made from hard monomers for compatibilization with the matrix polymer.

4. The polymeric composition of claim 3, wherein the particles in the elastomeric latex comprise a first nonelastomeric core layer, an intermediate elastomeric layer, and a final outer layer of the matrix polymer.

5. The polymeric composition of claim 4, wherein the first nonelastomeric core layer consists of 65-20 percent by weight butyl acrylate and 35-80 percent by weight methyl methacrylate,
and the intermediate elastomeric phase consists of 80-95 percent by weight butyl acrylate and 5-20 percent by weight styrene.

6. The polymeric composition of claim 4, wherein the first nonelastomeric core layer is not crosslinked.

7. The polymeric composition of claim 5, wherein the first nonelastomeric core layer is not crosslinked.

8. A process for the manufacture of a high impact strength polymeric composition, comprising the steps of:
   (A) mixing at least one matrix polymer based on methyl methacrylate and at least one elastomeric latex comprising the polymerization product of at least one soft monomer selected from the group consisting of butadiene and its derivatives, alkylacrylates, and aralkyl acrylates and at least one hard monomer selected from the group consisting of alkyl acrylates, styrene, substituted styrenes, acrylonitrile, and methacrylonitrile at a temperature between 170° C. and 240° C., and
   (B) adding and mixing at least one polymer based on fluorovinylidene with the mixture from step (A), at a temperature between 170° C. and 220° C.,
   wherein the amounts of matrix polymer, elastomeric latex, and polymer based on fluorovinylidene are such that the weight ratio of elastomeric latex to matrix polymer is between 0.1 and 0.5 and the weight ratio of polymer based on fluorovinylidene to matrix polymer is between 0.1 and 0.45.

9. A shaped article made from the polymeric composition of claim 1.

10. The shaped article of claim 9, wherein the shaped article is a sheet having a thickness between 1 and 8 mm.

11. A shaped article made from the polymeric composition of claim 5, wherein the shaped article is transparent.

12. A multilayered material comprising at least one layer of polymethyl methacrylate and one layer of the composition of claim 1.

* * * * *